United States Patent [19]

Murschall et al.

[11] Patent Number: 5,246,769
[45] Date of Patent: Sep. 21, 1993

[54] BIAXIALLY ORIENTED MULTILAYER POLYOLEFIN FILM

[75] Inventors: Ursula Murschall, Nierstein; Herbert Peiffer, Mainz-Finthen; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 766,364

[22] Filed: Sep. 26, 1991

[30] Foreign Application Priority Data

Sep. 28, 1990 [DE] Fed. Rep. of Germany ....... 4030669

[51] Int. Cl.⁵ .................. B32B 15/04; B32B 27/08
[52] U.S. Cl. .................. 428/216; 428/349; 428/451; 428/516; 428/910; 428/457
[58] Field of Search ............ 428/349, 216, 451, 910, 428/516

[56] References Cited

U.S. PATENT DOCUMENTS

| | | | |
|---|---|---|---|
| 4,419,411 | 12/1983 | Park | 428/516 |
| 4,514,534 | 4/1985 | DiNardo | 524/108 |
| 4,595,625 | 6/1986 | Crass et al. | 428/349 |
| 4,734,317 | 3/1988 | Bothe et al. | 428/451 |
| 4,997,700 | 3/1991 | Boothe et al. | 428/216 |

FOREIGN PATENT DOCUMENTS 0008904  3/1980  European Pat. Off. .

OTHER PUBLICATIONS

Ullmanns Enzyklopeadie der Technischen Chemie [Ullmann's Encyclopaedia of Industrial Chemistry]; 4th Edition, vol. 2, pp. 539–553.

*Primary Examiner*—P. C. Sluby
*Attorney, Agent, or Firm*—Foley & Lardner

[57] ABSTRACT

A transparent, coextruded multilayer polyolefin film which is heat-sealable on both sides and has a base layer essentially comprising propylene polymers and outer layers essentially comprising heat-sealable olefin polymers is described. The propylene polymer of the base layer has been peroxidically degraded, its degradation factor A being in the range of about 3 to about 10. The heat-sealable olefin polymer of the outer layers is an ethylene-propylene copolymer having an ethylene content in the range of about 2 to about 8% by weight which has also been peroxidically degraded. Its degradation factor A is in the range of about 3 to 15. The film is useful as, for example, a packaging film.

28 Claims, No Drawings

BIAXIALLY ORIENTED MULTILAYER POLYOLEFIN FILM

BACKGROUND OF THE INVENTION

The invention relates to a transparent, coextruded multilayer polyolefin film which is heat-sealable on both sides, wherein the base layer comprises polypropylene and the outer layers comprise heat-sealable olefin polymers. The invention furthermore relates to a process for the production of the film and to the use of the film.

Biaxially oriented multilayer polyolefin films which are heat-sealable on both sides and in which the base layer comprises propylene homopolymers and the two heat-sealable outer layers comprise heat-sealable olefin polymers are described in numerous publications including EP 194,588; EP 8,904; and U.S. Pat. No. 4,419,411. These multilayer polyolefin films have important properties for packaging films including broad heat-sealing range, good heat-sealing properties, relatively high scratch resistance, and low abrasion which gives good running properties on various types of high-speed packaging machines.

However, the films described are in need of improvement with respect to the optical properties of transparency and gloss.

SUMMARY OF THE INVENTION

It is therefore an object of the present invention to provide a biaxially oriented multilayer polyolefin film which is heat-sealable on both sides and which has excellent optical properties, i.e., high transparency and gloss, in addition to the above-mentioned important properties.

This object is achieved by providing a multilayer film, wherein
  a) the base layer of the multilayer film contains a propylene homopolymer which has been peroxidically degraded, its degradation factor A being in the range of about 3 to about 10, and
  b) the heat-sealable olefin polymer of the outer layers contains an ethylenepropylene copolymer having an ethylene content in the range of about 2 to about 8% by weight, based on the total weight of the copolymer, which has also been peroxidically degraded, its degradation factor A being in the range of about 3 to about 15.

It is further an object of the invention to provide a method for preparing the multilayer film comprising the steps of:
  i) coextruding melts corresponding to the individual layers to produce a multilayer film,
  ii) solidifying said multilayer film by cooling,
  iii) biaxially stretching said multilayer film, and
  iv) thermofixing said multilayer film.

There is further provided a laminate and a packaging film comprising the multilayer film.

Further objects, features and advantages of the present invention will become apparent from the detailed description of the preferred embodiments that follows.

DETAILED DESCRIPTION OF THE PREFERRED EMBODIMENTS

The multilayer film according to the invention has very high transparency, very high gloss and is suitable for universal use on high-speed packaging machines. In particular, the film according to the invention preferably has a haze of less than 17%, most preferably in the range of 16 to 12%. Its gloss, measured at an angle of incidence of 20°, is preferably at least 110, and is most preferably in the range of 115 to 130.

The outer layers may each optionally be corona- or flame-treated on their free surface.

The thickness of the heat-sealing layers is preferably greater than 0.3 $\mu$m, most preferably in the range of 0.4 to 1.5 $\mu$m.

The base layer comprises a peroxidically degraded propylene polymer which predominantly comprises propylene units and preferably has a melting point in the range of 162° to 168° C. Isotactic polypropylene having an n-heptanesoluble content of 6% by weight or less is a preferred propylene polymer. In order to achieve the required good optical properties, the peroxidically degraded propylene homopolymer has a degradation factor A of 3 to 10, preferably from 4 to 8. The melt flow index of the starting polypropylene powder is preferably less than 1.5 g/10 min, most preferably of 0.2 to 0.9 g/10 min (measurement in accordance with DIN 53 735, at a load of 21.6 N and at 230° C.). The starting polypropylene powder is degraded to achieve a preferred melt flow index of the granules of 2 to 5.5 g/10 min (measurement in accordance with DIN 53 735, at a load of 21.6 N and at 230° C.) during extrusion by addition of organic peroxides. Preferred peroxides include dialkyl peroxides, such as 2,5-dimethyl-2,5-di(t-butylperoxy)hexane or di-tbutyl peroxide.

The degradation factor A of the propylene homopolymer is defined as $$A = \frac{S_{G(PP)}}{S_{P(PP)}}$$

where
  $S_{G(PP)}$ = melt flow index of the degraded PP granules and
  $S_{P(PP)}$ = melt flow index of the starting PP powder, each melt flow index being measured in accordance with DIN 53 735 at a load of 21.6 N and at 230° C.

The heat-sealable olefin polymer of the outer layer contains a peroxidically degraded ethylenepropylene copolymer which preferably has an ethylene content of 3 to 7% by weight and hence a propylene content of 93–97% based on the total weight of the copolymer. In order to achieve the required good optical properties, the peroxidically degraded copolymer has a degradation factor A of 3 to 15, preferably of 6 to 10. The melt flow index of the $C_2/C_3$ starting powder is preferably less than 3.0 g/10 min (measured in accordance with DIN 53 735, at a load of 21.6 N and at 230° C.). The starting $C_2/C_3$ powder is degraded to a preferred melt flow index of the granules of 5.5 to 15 g/10 min before extrusion by adding organic peroxides. Preferably the melt flow index of the copolymer is greater than that of the polypropylene of the base layer.

The degradation factor A of the ethylenepropylene copolymer is defined as $$A = \frac{S_{G(cop.)}}{S_{P(cop.)}}$$

where
  $S_{G(cop.)}$ = melt flow index of degraded ethylenepropylene copolymer granules and $S_{P(cop.)}$ = melt flow index of the starting ethylenepropylene copolymer powder, the melt flow index being measured in accordance with DIN 53 735 at a load of 21.6 N and at 230° C.

Peroxidic degradation and peroxidically degraded or CR ("controlled rheology") polypropylene homopolymers as such, are known in the literature (cf. Plastverarbeiter, Volume 38, 1987, No. 4; Polymer Engineering and Science, March 1989, Vol. 29, No. 6; plastverarbeiter, Vol. 36, 1985, No. 11). Peroxidically degraded propylene homopolymers of this type are used, in particular, in injection molding and in the production of fibers. Peroxidically degraded $C_2/C_3$ copolymers having a $C_2$ content of from 1 to 2.5% by weight are in some cases also employed for unstretched office films (organisation sector). However, there is no mention of the magnitude of the degradation factor for these products.

The ethylene content of the copolymer is determined using $^{13}C$ NMR spectroscopy. The measurements were carried out using a Bruker HX-270 (Germany) nuclear magnetic resonance spectrometer fitted with a Bruker Aspect 2000 computer. To carry out the measurement, the ethylene-propylene copolymer to be characterized is dissolved in a solvent mixture comprising 65% by volume of hexachlorobenzene and 35% by volume of 1,1dideuterotetrachloroethane, giving a 10% by weight solution. As reference standard, octamethyltetrasiloxane (CMTS) is added. The 67.9 MHz $^{13}C$ nuclear magnetic resonance spectrum is measured at 130° C. The spectra are evaluated by the method described in J. C. Randall, Polymer Sequence Distribution (Academic Press, New York, 1977).

The olefin polymer of the heat-sealable layers has a lower melting point than the propylene polymer of the base layer. The melting point of the olefin polymer is preferably in the range of 80° to 160° C., most preferably of 100° to 140° C.

Surprisingly, it was found that the combination of said parameters for the propylene homopolymer of the base layer and for the ethylene-propylene copolymer of the outer layers and the outer layer thicknesses of the film must be kept within narrow limits in order to simultaneously optimize all the properties mentioned previously.

If the degradation factor of the propylene homopolymer is less than 3, the optical properties are impaired giving significant increase in film haze and reduction in surface gloss. If the degradation factor is greater than 10, problems occur in stretching, resulting in an extremely adverse effect on the running reliability during film production. At a degradation factor of greater than 10, the propylene homopolymer can only be stretched in a very narrow temperature range or not at all.

The ethylene content of the copolymer is important for the heat-sealing properties. If the ethylene content is less than 2%, the film can only be heat-sealed at significantly higher temperatures or not at all. If the film is to be printed or metallized, the ethylene content of the copolymer is of particular importance for the ability to be surface treated by electrical corona discharge or flame and for the long-term stability of the adhesion properties. If the ethylene content is less than 2% by weight, the ability of the film to be corona treated is poor and the decay behavior of the treatment intensity is unfavorable.

If the degradation factor of the $C_2/C_3$ copolymer is less than 3, the optical properties are impaired resulting in increase in film haze and reduction in surface gloss. If the degradation factor is greater than 15, problems occur during stretching.

If the melt flow index of the $C_2/C_3$ powder is greater than 3 g/10 min (21.6 N/230°), the preferred degradation factor of 6 to 10 causes the melt flow index of the $C_2/C_3$ granules to be excessively high. An excessive viscosity difference between the polypropylene base material and the copolymer outer layer causes undesired flow impairment in the melt.

If the thickness of the outer layers is less than 0.4 µm, in particular less than 0.3 µm, the heat-sealing properties and the ability of the film to be corona treated are impaired. In addition, the long-term behavior of the pretreatment intensity is unfavorable.

In order to further improve certain properties of the polyolefin film according to the invention, both the base layer and the two outer layers may contain appropriate additives in an effective amount. These additives include antistatic agents, antiblocking agents, lubricants, stabilizers and/or low-molecular-weight resins, which are compatible with the polymers of the base layer and/or the heat-sealing layers.

Preferred antistatics include alkali metal alkanesulfonates, polyether-modified, i.e., ethoxylated and/or propoxylated, polydiorganosiloxanes such as polydialkylsiloxanes, polyalkylphenylsiloxanes and the like, and/or essentially straight-chain and saturated, aliphatic, tertiary amines which contain an aliphatic radical having 10 to 20 carbon atoms and are substituted by $\omega$ hydroxy($C_1$–$C_4$)alkyl groups, of which N,N-bis(2hydroxyethyl) alkylamines containing ($C_{10}$–$C_{20}$)-,preferably ($C_{12}$–$C_{18}$)-alkyl groups are particularly suitable. The effective amount of antistatic is generally in the range of 0.05 to 3% by weight, based on the weight of the layer containing the antistatic agent.

Suitable antiblocking agents include inorganic additives, such as silicon dioxide, calcium carbonate, magnesium silicate, aluminum silicate, calcium phosphate, and the like, nonionogenic surfactants, anionic surfactants and/or incompatible organic polymers, such as polyamides, polyesters, polycarbonates, and the like. The effective amount of the antiblocking agent is generally in the range of 0.1 to 2% by weight, based on the weight of the layer containing the antiblocking agents.

Suitable lubricants include higher aliphatic acid amides, waxes, metal soaps and polydiorganosiloxanes, preferably polydialkylsiloxanes. The effective amount is generally from 0.1 to 2.5% by weight, based on the weight of the layer containing the lubricant.

Stabilizers which can be employed include the conventional stabilizing compounds for polymers of ethylene, propylene and other α-olefins. The effective amount is generally from 0.1 to 2% by weight, based on the weight of the layer containing the stabilizers.

The low-molecular-weight resins recommended as an additive include a natural or synthetic resin having a softening point of 60° to 180° C., preferably 80° to 150° C. (determined in accordance with ASTM E-28). Of the numerous low-molecular-weight resins, hydrocarbon resins such as petroleum resins, styrene resins, cyclopentadiene resins, or terpene resins (these resins are described in Ullmanns Enzyklopädie der Techn. Chemie, [Ullmann's Encyclopedia of Industrial Chemistry], 4th Edition, Volume 2, pages 539 to 553) are preferred. Preferably the low-molecular-weight resin has a number average molecular weight of 200 to 1000. The preferred amount of low-molecular-weight resin is 3 to 15% by weight, most preferably 5 to 10% by weight, based on the weight of the layer containing the resin.

The thickness of the multilayer polyolefin film according to the invention may vary within broad limits and depends, in particular, on the intended use. Its overall thickness is preferably from 10 to 50 µm, most preferably from 20 to 40 µm. The heat-sealing layers are preferably each thicker than 0.3 µm, most preferably 0.4 to 1.5 µm thick. The thickness of the base layer preferably makes up from 50 to 90% of the total film thickness.

In the multilayer film according to the invention, the outer layers may have the same or different compositions. The multilayer film is produced by any known process, preferably by the known coextrusion process. Within the confines of this process, the melts corresponding to the individual layers of the film are coextruded through a flat-film die, the resultant film is solidified by cooling, the film is biaxially stretched (oriented), the biaxially stretched film is thermofixed, and the surface layer intended for corona treatment is corona treated. The biaxial stretching (orientation) may be carried out simultaneously or consecutively. Consecutive biaxial stretching, in which the film is first stretched longitudinally (in the machine direction) and then transversely (perpendicular to the machine direction), is preferred. The film is preferably stretched from 4 to 7:1 in the longitudinal direction and from 8 to 10:1 in the transverse direction. The longitudinal stretching is preferably carried out at a film temperature of 120° to 140° C., and the transverse stretching is preferably carried out at 160° to 175° C. The longitudinal stretching is expediently carried out using two rollers running at different speeds corresponding to the intended stretching ratio, and the transverse stretching is expediently carried out using an appropriate tenter frame. The biaxial stretching of the film is followed by thermofixing (heat treatment) thereof. In this step, the film is preferably kept at a temperature of 150° to 160° C. for from 0.5 to 10 seconds.

If it is desired that the multilayer polyolefin film should be printable or metallizable, the film is corona treated. The electrical corona treatment is preferably carried out at an alternating voltage of 10,000 V and 10,000 Hz, on one or both sides as desired. The film produced in this way is wound up in a conventional manner using a wind-up unit and has, immediately after production, a surface tension on the treated side of preferably of 36 to 42 mN/m, most preferably of 38 to 40 mN/m.

The multilayer polyolefin film according to the invention is particularly suitable as a packaging film on high-speed packaging machines. This is because it has all the important properties required of polyolefin films with respect to high-speed machines. It has, in particular, the ability to be heat-sealed on both sides, high scratch resistance, good running properties, very good optical properties, in particular high gloss and low haze, and good printability.

Since the multilayer polyolefin film according to the invention also has good immediate and long-term printability properties after the corona treatment, it is also suitable for the production of laminates with paper, with board, with metals with metallized plastic films and with unmetallized plastic films, and as a base film for aqueous barrier coating systems, for example, systems based on aqueous dispersions of polyvinylidene chloride or ethylene-vinyl alcohol copolymers. It can also be printed with aqueous printing inks, for example with two-component reactive dyes, with excellent results.

If the corona treatment is omitted, the multilayer polyolefin film according to the invention is particularly suitable as a cigarette packaging film since it has extremely low haze and very good gloss in addition to the important properties required with respect to high-speed packaging machines.

The invention is described in greater detail below with reference to working examples.

The films of the examples and comparative examples are each biaxially oriented by use of a longitudinal stretching ratio of 5:1 and transverse stretching ratio of 10:1. The films are transparent polyolefin films having a base layer comprising an isotactic polypropylene having an n-heptane-soluble content of 4.5% by weight and a melting point of 165° C. as the principal component. The base layer is approximately 19 µm thick, and the two heat-sealing layers covering the base layer are each 0.8 µm thick. Films having the layer sequence A-B-A are produced, where A is the outer layer and B the base layer. The three-layer polyolefin films have been produced by the known coextrusion process.

All the layers contain 0.12% by weight of pentaerythrityl tetrakis-3-(3,5-di-tertiary-butyl-4-hydroxyphenyl)propionate (Irganox 1010®) for stabilization and 0.06% by weight of calcium stearate for neutralization of acidic catalyst residues. The base layer also contains 0.15% by weight of N,N-bis(2-hydroxyethyl)-($C_{10}$–$C_{20}$)alkylamine (Armostat 300®) as antistatic.

EXAMPLE 1

The isotactic propylene homopolymer of the base layer is degraded from a starting polypropylene powder having a melt flow index $S_{P(PP)}$ of 0.7 g/10 min (determined in accordance with DIN 53 735 at a load of 21.6 N and at 230° C.) by addition of di-t-butyl peroxide to give a melt flow index of the granules $S_{G(PP)}$ of 3.5 g/10 min (DIN 53 735 at a load of 21.6 N and at 230° C.), giving a degradation factor A of 5.

The random ethylene-propylene copolymer of the heat-sealing layers is degraded from a melt flow index of a starting powder $S_{P(cop.)}$ of 0.7 g/10 min (DIN 53 735 at a load of 21.6 N and at 230° C.) by addition of di-t-butyl peroxide to a melt flow index of the granules of 5.6 g/10 min (DIN 53 735 at a load of 21.6 N and at 230° C.), giving a degradation factor A of 8. The peroxidically degraded ethylene-propylene copolymer has an ethylene content of 4.0% by weight and is blended with 0.8% by weight of polydimethylsiloxane having a viscosity of 30,000 mm²/s at 25° C. and 0.3% by weight of silicon dioxide having a mean particle diameter of 2 µm.

EXAMPLE 2

The isotactic propylene homopolymer of the base layer is degraded from a starting polypropylene powder having a melt flow index $S_{P(PP)}$ of 0.5 g/10 min (determined in accordance with DIN 53 735 at a load of 21.6 N and at 230° C.) by addition of di-t-butyl peroxide to give a melt flow index of the granules $S_{G(PP)}$ of 3.5 g/10 min (DIN 53 735 at a load of 21.6 N and at 230° C.), giving a degradation factor A of 7.

The random ethylene-propylene copolymer of the heat-sealing layers is degraded from a melt flow index of a starting powder $S_{P(cop.)}$ of 0.6 g/10 min (DIN 53 735 at a load of 21.6 N and at 230° C.) by addition of di-t-butyl peroxide to a melt flow index of the granules $S_{G(cop.)}$ of 6.0 g/10 min (DIN 53 735 at a load of 21.6 N and at 230° C.), giving a degradation factor A of 10. The peroxidically degraded ethylenepropylene copolymer has an ethylene content of 4.0% by weight and is blended with 0.8% by weight of polydimethylsiloxane having a viscosity of 30,000 mm²/s at 25° C. and 0.3% by weight of silicon dioxide having a mean particle diameter of 2 μm.

EXAMPLE 3

The propylene homopolymer of the base layer and the random ethylene-propylene copolymer of the heat-sealing layers are peroxidically degraded as in Example 1. However, the three-layer film produced now has an A-B-C structure (A and C =heat-sealing layers, B =base layer), the peroxidically degraded ethylene-propylene copolymer of layer A containing 1.6% by weight of polydimethylsiloxane having a viscosity of 30,000 mm²/s at 25° C. and 0.3% by weight of silicon dioxide having a mean particle diameter of 2 μm. The peroxidically degraded copolymer of layer C contains 0.3% by weight of silicon dioxide having a mean particle diameter of 2 μm and no polydimethylsiloxane. Layer C is corona-treated, the surface tension of this side being 40 mN/m immediately after production.

EXAMPLE 4

The propylene homopolymer of the base layer and the random ethylene-propylene copolymer of the heat-sealing layers are peroxidically degraded as in Example 2. The three-layer film produced has, as in Example 3, an A-B-C structure (A and C heat-sealing layers, B =base layer), the peroxidically degraded ethylene-propylene copolymer of layer A containing 2.4% by weight of polydimethylsiloxane having a viscosity of 30,000 mm²/s at 25° C. and 0.3% by weight of silicon dioxide having a mean particle diameter of 2 μm. The peroxidically degraded copolymer of layer C contains 0.3% by weight of silicon dioxide having a mean particle diameter of 2 μm and no polydimethylsiloxane. As in Example 3, layer C is corona treated, the surface tension of this side being 40 mN/m immediately after production.

EXAMPLE 5

The propylene homopolymer of the base layer and of the random ethylene-propylene copolymer of the heat-sealing layers are peroxidically degraded as in Example 2. However, the peroxidically degraded copolymer has an ethylene content of 6.0% by weight. Layers A and C are formulated as in Example 3, layer C being corona treated as in Example 3.

COMPARATIVE EXAMPLE 1

A three-layer film is produced as in Example 2. The isotactic propylene homopolymer likewise has a melt flow index of the granules of 3.5 g/10 min (DIN 53 735 at a load of 21.6 N and at 230° C.), but has not been peroxidically degraded.

The random ethylene-propylene copolymer of the outer layers is peroxidically degraded as in Example 2 and is blended with additives as in Example 2.

COMPARATIVE EXAMPLE 2

A three-layer film is produced as in Example 2. The polypropylene polymer of the base layer likewise has a melt flow index of the granules of 3.5 g/10 min (DIN 53 735 at a load of 21.6 N and at 230° C.), but has not been peroxidically degraded.

The random ethylene-propylene copolymer is formulated as in Example 2 and has, as in Example 2, a melt flow index of the granules of 6.0 g/10 min (DIN 53 735 at a load of 21.6 N and at 230° C.). However, the random ethylene-propylene copolymer of the outer layers has not been peroxidically degraded.

COMPARATIVE EXAMPLE 3

A three-layer film having an A-B-C structure is produced as in Example 5. Neither the propylene homopolymer of the base layer nor the random ethylene-propylene copolymer of the heat-sealing layers has been peroxidically degraded.

COMPARATIVE EXAMPLE 4

A three-layer film having an A-B-C structure is produced in accordance with Example 1 of European Patent 194,588.

COMPARATIVE EXAMPLE 5

A three-layer film is produced in accordance with Example 4 of U.S. Pat. No. 4,419,411.

The following measurement methods were used to characterize the raw materials and films:

Ethylene content: As described above.

Melt flow index: DIN 53 735 at 230° C. and a load of 21.6 N

Haze: The haze of the film is measured in accordance with ASTM-D 1003-52, using a 1° slit diaphragm instead of a 4° pinhole diaphragm, and the haze is indicated in percent for four film layers one on top of the other. The four layers were selected since the optimum measurement range is thereby utilized. The haze evaluation was carried out with:

| | |
|---|---|
| ≦17% = | very good (++) |
| ≧17% to 20% = | good (+) |
| ≧20% to 25% = | moderate (±) |
| ≧25% = | poor (−) |

Gloss: The gloss is determined in accordance with DIN 67 530. The reflector value is measured as an optical characteristic of the surface of a film. In accordance with ASTM-D 523-78 and ISO 2813 standards, the angle of incidence was set at 20°. A light beam hits the planar test surface at the set angle of incidence and is reflected or scattered by this surface. The light beams hitting the photoelectronic receiver are indicated as a proportional electrical quantity. The measurement value is dimensionless and must be indicated together with the angle of incidence. The gloss is assessed (angle of incidence 20°) with:

| | |
|---|---|
| ≧115 = | very good (++) |
| ≦115 to 110 = | good (+) |
| ≦110 to 100 = | moderate (±) |
| ≦100 = | poor (−) |

Scratch resistance or scratch sensitivity: The scratch resistance is determined in accordance with DIN 53 754. The scratch resistance is determined using the Taber model 503 Abraser from Teledyne Taber, using Calibrade R H 18 abrasive wheels at a load of 250 g. Scratch resistance or scratch sensitivity is taken to mean the increase in haze of the scratched film compared with the original film after 50 revolutions of the sample plate. The scratch resistance is very good (++) if the increase in haze is ≦22%,
good (+) if the increase in haze is from 22 to 25%,
moderate (±) if the increase in haze is 25-30%, and
poor (−) if the increase in haze is greater than 30%.

Determination of the seal weld strength: Two 15 mm wide strips are placed one on top of the other and heat-sealed at 130° C. for a sealing time of 0.1 s and at a sealing pressure of 1.5 N/cm². The seal strength is determined by the T-peel method.

Determination of the corona-treatment intensity: The corona treatment is carried out in such a manner that the treated film surface in each case has a treatment intensity of 40 mN/m immediately after the treatment. The treatment intensity is determined by the ink method (DIN 53 364).

Determination of the printability: The corona-treated films are printed 14 days after production (short-term assessment) and 6 months after production (long-term assessment). The adhesion of the ink is assessed by an adhesive tape test. If small amounts of ink can be detached by means of adhesive tape, the adhesion of the ink is moderate and if considerable ink detachment occurs, the adhesion is poor.

Table 1 below summarizes the properties of the three-layer polyolefin films of the examples and comparative examples.

As the results show, the three-layer polyolefin films according to the invention are clearly superior to those of the prior art. Only the films according to the invention satisfy the high demands with respect to very low film haze, high surface gloss, good scratch resistance, heat-sealability on both sides and running properties (smooth passage through the machine) and good printability, and are thus distinguished by universal use as packaging films and universal suitability on high-speed packaging machines

TABLE 1

| | Haze 4-layer | Gloss (measurement angle 20°) 1st side/2nd side | Scratch resistance | Heat-sealability 1st side/* 2nd side | Passage through the machine | Printability |
|---|---|---|---|---|---|---|
| Example 1 | ++ | ++/++ | ++ | ++/++ | ++ | (**) |
| Example 2 | ++ | ++/++ | ++ | ++/++ | ++ | (**) |
| Example 3 | ++ | ++/++ | ++ | ++/+ | ++ | ++ |
| Example 4 | ++ | ++/++ | ++ | ++/+ | ++ | ++ |
| Example 5 | ++ | ++/++ | ++ | ++/++ | ++ | ++ |
| Comp. Example 1 | ± | ±/± | + | ++/++ | ++ | (**) |
| Comp. Example 2 | − | −/− | ± | ++/++ | ++ | (**) |
| Comp. Example 3 | − | −/− | ± | ++/++ | ++ | ++ |
| Comp. Example 4 | − | −/− | ± | ++/+ | + | ++ |
| Comp. Example 5 | − | −/− | ± | +/− | + | ++ |

*2nd side: If corona treatment has been carried out, the second side (C layer) has been corona treated
(**) These three-layer films were not corona treated
In the table:
++ denotes very good
+ denotes good
± denotes moderate
− denotes poor

What is claimed is:

1. A transparent multilayer polyolefin film comprising,
   a) a base layer consisting essentially of a propylene homopolymer which has been peroxidically degraded so that the degradation factor A is in the range of about 3 to about 10,
   b) a first heat-sealable outer layer on a first side of said base layer and
   c) a second heat-sealable outer layer on a second side of said base layer, wherein said first and said second heat-sealable layers comprise the same or different ethylene-propylene copolymers having an ethylene content in the range of about 2 to about 8% by weight, based on the total weight of the copolymer, which have been peroxidically degraded so that the degradation factor A is in the range of about 3 to about 15.

2. A multilayer film as claimed in claim 1, wherein one or both of said outer layers have been corona- or flame-treated on their free surface.

3. A multilayer film as claimed in claim 1, wherein the thickness of each heat-sealing layer is greater than about 0.3 μm.

4. A multilayer film as claimed in claim 3, wherein said thickness is about 0.4 to about 1.5 μm.

5. A multilayer film as claimed in claim 1, wherein the peroxidically degraded propylene homopolymer of the base layer has a degradation factor A of about 4 to about 8.

6. A multilayer film as claimed in claim 1, wherein the heat-sealable olefin polymer of the outer layer consists essentially of a peroxidically degraded ethylene-propylene copolymer which has an ethylene content of about 3 to about 7% by weight and a degradation factor A of from about 6 to about 10.

7. A multilayer film as claimed in claim 6 which is biaxially oriented and coextruded and has a haze of less than about 17% and a gloss of greater than about 115, wherein the peroxidically degraded propylene homopolymer of the base layer is an isotactic polypropylene having an n-heptane-soluble content of about 6% by weight or less, a melting point of about 162° to about 168° C., a degradation factor of about 4 to about 8, and a melt flow index of about 2 to about 5.5 g/10 min, and
wherein the ethylene-propylene copolymers have a melt flow index of about 5.5 to 15 g/10 min, and wherein the heat-sealable layers have a thickness of about 0.4 to about 1.5 μm.

8. A multilayer film as claimed in claim 1, which has a haze of less than about 17%, and a gloss, measured at an angle of incidence of 20°, of at least about 110.

9. A multilayer film as claimed in claim 8 which has a haze of about 12-16% and a gloss of about 115 to about 130.

10. A multilayer film as claimed in claim 1, wherein said propylene homopolymer before degradation has a melt flow index of less than about 1.5 g/10 min and said copolymers before degradation have a melt flow index of less than about 3.0 g/10 min.

11. A multilayer film as claimed in claim 10, wherein the degraded homopolymer has a melt flow of about 2 to about 5.5 g/10 min. and the degraded copolymers have a melt flow of about 5.5 to 15 g/10 min.

12. A multilayer as claimed in claim 1, wherein said propylene homopolymer has a melting point of about 162° to about 168° and said copolymers have a melting point of about 80° to 160° C.

13. A multilayer film as claimed in claim 1, wherein said propylene homopolymer is isotactic polypropylene having an n-heptane-soluble content of about 6% by weight or less.

14. A multilayer film as claimed in claim 1, wherein one or more of the layers contains an antistatic agent in an amount in the range of about 0.05 to about 3% by weight, based on the weight of the layer containing the antistatic agent.

15. A multilayer film as claimed in claim 1, wherein one or more of the layers contains an antiblocking agent in an amount of about 0.1 to about 2% by weight, based on the weight of the layer containing the antiblocking agent.

16. A multilayer film as claimed in claim 1, wherein one or more of the layers contains a lubricant in an amount of about 0.1 to about 2.5% by weight, based on the weight of the layer containing the lubricant.

17. A multilayer film as claimed in claim 1, wherein one or more of the layers contains a stabilizer in an amount of about 0.1 to about 2% by weight, the weight percents based on the weight of the layer containing the additive.

18. A multilayer film as claimed in claim 1, wherein one or more of the layers contains a low molecular weight resin having a number average molecular weight of about 200 to about 1000, in an amount of about 3 to 15% by weight, the weight percent based on the weight of the layer containing the additive.

19. A multilayer film as claimed in claim 1, which has an overall thickness of about 10 to about 50 μm, wherein the heat-sealing layers each have a thickness of at least about 0.3 μm.

20. A multilayer film as claimed in claim 19, wherein the overall thickness is about 20 to about 40 μm, and the heat-sealing layers each have a thickness of about 0.4 to about 1.5 μm.

21. A multilayer film as claimed in claim 1, wherein said multilayer film is printed with an aqueous printing ink.

22. A multilayer film as claimed in claim 1, wherein said multilayer film is coated with an aqueous barrier coating.

23. A multilayer film as claimed in claim 1 which is produced by a method comprising the steps of
  i) coextruding melts corresponding to the individual layers of the film through a flat-film die to produce a multilayer film,
  ii) solidifying said multilayer film by cooling,
  iii) biaxially stretching said multilayer film, and
  iv) thermofixing said multilayer film, with the proviso that the individual polymers are peroxidically degraded before said coextruding step.

24. A multilayer film of claim 23, wherein said thermofixing is followed by corona or flame treatment of at least one of said outer layers.

25. A multilayer film of claim 23, wherein degradation of at least one of said polpylene homopolymer and said olefin polymers is accomplished by use of dialkyl peroxides.

26. A laminate comprising the multilayer film of claim 1, and a layer comprising paper, metal plastic film, cardboard, or unmetallized plastic film.

27. A packaging film consisting essentially of multilayer film as claimed in claim 1.

28. A packaging film as claimed in claim 27, which is a cigarette packaging film.

* * * * *

UNITED STATES PATENT AND TRADEMARK OFFICE
CERTIFICATE OF CORRECTION

PATENT NO. : 5,246,769
DATED : September 21, 1993
INVENTOR(S) : Murschall et al.

It is certified that error appears in the above-indentified patent and that said Letters Patent is hereby corrected as shown below:

Claim 12, Column 11, Line 16, "as claimed" should read --film as claimed--.

Claim 25, Column 12, Line 34, "polpylene" should read --propylene--.

Claim 26, Column 12, Line 38, "metal plastic film," should read --metal, metallized plastic film,--.

Signed and Sealed this

Second Day of August, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO.    : 5,246,769
DATED         : September 21, 1993
INVENTOR(S)   : Ursula Murschall et al It is certified that error appears in the above-indentified patent and that said Letters Patent is hereby corrected as shown below:

Claim 6, column 10, lines 25 and 26, "consists essentially of a peroxidically" should read --comprises a peroxidically degraded--.

Signed and Sealed this

Twenty-second Day of November, 1994

Attest:

BRUCE LEHMAN

Attesting Officer

Commissioner of Patents and Trademarks